(12) United States Patent
Kleinke et al.

(10) Patent No.: US 6,379,769 B1
(45) Date of Patent: Apr. 30, 2002

(54) TEMPERATURE CONTROLLED RADIATION TRANSMISSION MATERIAL

(75) Inventors: Andreas Kleinke, Ludwigshafen; Thomas Kessler, Schifferstadt; Ekkehard Jahns, Weinheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/294,029

(22) Filed: Apr. 20, 1999

(30) Foreign Application Priority Data

Apr. 30, 1998 (DE) .......................................... 198 19 552

(51) Int. Cl.⁷ ................................................. B32B 3/04
(52) U.S. Cl. ........................... 428/68; 428/1.1; 428/1.3; 428/1.6; 428/69; 428/76; 428/101
(58) Field of Search .............................. 428/68, 69, 76, 428/138, 101, 1.1, 1.3, 1.6

(56) References Cited

FOREIGN PATENT DOCUMENTS

| DE | 19521494 A1 | * | 12/1996 |
| EP | 382379 A2 | * | 8/1990 |
| EP | 890444 A2 | * | 1/1999 |

* cited by examiner

Primary Examiner—Nasser Ahmad
(74) Attorney, Agent, or Firm—Oblon, Spivak, McClelland, Maier & Neustadt, P.C.

(57) ABSTRACT

Disclosed is a temperature controlled radiation transmission material for plural component films, the material being present in one or more cores allsidedly surrounded by a transparent sheath layer. The plural component films are particularly useful for the reversibly temperature dependent control of the radiation transmission of buildings and of technical facilities, especially solar energy apparatus, in the apparel industry and/or for decorative purposes.

13 Claims, No Drawings

TEMPERATURE CONTROLLED RADIATION TRANSMISSION MATERIAL

This invention relates to temperature controlled radiation transmission materials and to their use for the reversibly temperature dependent control of the radiation transmission of buildings and of technical facilities.

BACKGROUND OF THE INVENTION

The irradiation of closed spaces or technical apparatus, for example solar energy apparatus, with light causes them to heat tip to an extent which differs, and may even be harmful, with the energy content and the intensity of the light. For example, undesirable temperature values arise in buildings, greenhouses or cars because the energy content of sunlight varies with The time of day and season.

Prior artisans have therefore developed materials which are based on polymer blends which, as a function of the temperature, reversibly separate and thus become cloudy. The basis for the mechanism of this thermotropic behavior is that the structure of the polymer system changes at a certain temperature in such a way that its transmission of radiation changes. This phenomenon will usually arise when polymer blend components having different refractive indices separate at a certain temperature. The temperature at which this process takes place is known as the lower critical separation temperature (LCST). Fundamental explanations on the relationship between The structure of polymer blends and the occurrence of LCST behavior and on the use of polymer blends in glazing systems possessing temperature controlled light transmission may be found in EF-B-0 181 485.

Materials possessing improved reversibility of the change in radiation transmission are disclosed in EP-B-0 559 113 and DE-A 44 08 156.

EP-B-0 181 485 discloses plural component films comprising a polymeric mixture having a lower critical solution temperature (LCST), which are produced directly in one production stop by coextrusion, for example together with a base layer and/or a top layer. In the known plural component films the thermotropic polymer is disposed as a continuous layer between 2 layers composed of another polymer. The adhesion between the thermotropic polymer layer and base and/or top layers is therefore frequently insufficient and the coextruded films may delaminate in use.

SUMMARY OF THE INVENTION

It is an object of the present invention to provide plural component films which do not have the disadvantages of the prior art and which, more particularly, exhibit improved cohesion.

We have found that this object is achieved by a temperature controlled radiation transmission material for plural component films, the material being present in one or more cores allsidedly surrounded by a transparent sheath layer.

Temperature controlled radiation transmission polymer systems as described for example in DE-A 4 408 156, EP-B-0 181 485 or EP-B-0 559 113 tend to become sticky, especially at higher application temperatures, and their mechanical strength is low. We have determined that a transparent sheath layer which completely surrounds at least one core composed of one of the known thermotropic polymer blends provides stickiness control and mechanical strength and so makes it possible to put the thermotropic polymer blend into film form.

Moreover, the different refractive indices or core and sheath create the optical impression of a larger cote cross section (magnifying glass effect). The core comprises the costly special effect substance. By using the plural component film material of the invention it is thus possible to, obtain the same effect with a smaller amount or the costly special effect Substance as with a larger amount of unsheathed special effect substance.

DETAILED DESCRIPTION

The core material used can be selected from known thermotropic polymer blends as described for example in EP B-0 181 485, EP-B-0 559 113 or DE-4 408 156. It is essential that these materials have a lower critical separation temperature (LCST), which is known to occur in the case of polymer blends whose components exhibit a medium sized interaction, for example according to one or the mechanisms like salt formation, hydrogen bonding, complexing, p-electron interaction or dipolar interaction.

Polymers suitable for thermotropic polymer blends can be selected from a number of known polymers, for example homo- and, copolymers whose mutual interactions have cloud points within the suitable range. Examples of suitable polymers are polystyrene, polyvinyl methyl ether, polymethyl (meth)acrylate, styrene-acrylonitrile copolymers, poly-ε-caprolactone, chlororubber, ethylene-vinyl acetate copolymers, PVC, polycarbonate, polyvinylidene fluoride, polyethyl acrylate, poly-n-butyl acrylate, poly(ethylhexyl) acrylate-co-acrylic acid), poly(tetradecyl methacrylate-co-styrene-co-3-dimethylamino-2,2-dimethlylprop-1-yl methacrylate), poly(styrene-co-hydroxyethyl methacrylate), poly-propylene oxide.

By changing the relative level of the individual comonomers (interacting groups) in a copolymer it is very simple to set the critical clouding temperature to a desired value.

The relative level of the comonomers is not critical. It is customarily within the range from 0.1 to 50 mol %, preferably within the range from 0.5 to 25 mol %.

The number average molecular weight M of the polymers P1 or P2 is not critical per se, but is generally within the range from 500 to 1,000,000, preferably within the range from 1000 to 500,000.

The mixing ratio of the polymers P1 and P2 depends on the desired clouding temperature and is freely chooseable in this respect. The mixing ratios P1:P2 are generally within the range from 5:95 to 95:5% by weight, preferably within the range from 20:80 to 80:20% by weight.

Suitable polymer systems may further comprise known photoinitiators, which may also be copolymers forming part of polymer chains.

The thermotropic polymer blend may have added to it customary substances, for example lubricants, additives, UV stabilizers, processing stabilizers (antioxidants for example), anticorrosives, plasticizers, dyes or pigments.

The thermotropic polymer blends are melted in suitable apparatus, for example in heated vessels which automatically empty in the downward direction. Particularly suitable arc drum type melters as used in hotmelt adhesive metering, where only the lid is heated and the polymer material to be melted passes through a heated hose directly into the die. This form of melting has the advantage of a short melting time during which the thermotropic polymer blend cannot separate. It is also possible to melt the thermotropic polymer blend in an extruder.

The molten polymer blend is fed via a pump, for example a gear pump or a piston pump or an extruder to a die suitable for the production of plural component films.

The processing temperatures for the thermotropic polymer blend range from 40° C. to 250° C.

Useful sheath materials are polymers which, owing to their material properties, can be processed into fibers and which must not be miscible with the thermotropic polymer blend used its core material. Examples of suitable sheath materials are polyacrylonitrile, modacrylics, polyesters, polyolefins, such as polyethylene, polypropylene, ethylene vinyl acetate, polyamide, aramid, polyurethane, high temperature polymers, such as polyphenylene sulfide, polyether ketone, polyvinyl chloride, polyvinylidene chloride, polyvinylidene fluoride, polytetrafluoroethylene, polyethylenetetra-fluoroethylene. The sheath material is melted in a suitable manner, for example in a single screw or twin screw extruder. The processing temperatures for the sheath material in the extruder range from 80° C. to 250° C., depending on the softening point of the sheath material. The temperatures can also be higher, up to 400° C., for specific, high melting sheath polymers. This, is especially the case with high temperature resistant polymers and fluorine-containing polymers, for example polytetrafluoroethylene and derivatives. Otherwise, the sheath material may preferably comprise assistants, such as lubricants, additives, UV screens, hindered amine light stabilizers (HALS), processing stabilizers such as antioxidants, dyes and pigments.

It is a particular advantage of the core-sheath structure of the materials of the invention that it is possible to use even such assistants whose compatibility with the thermotropic core material is not ensured. For such assistants, especially dyes and pigments, there is the option of formulation into the sheath polymers.

Similarly, UV screens are preferably formulated in sheath polymers, since the same use level in the sheath polymer provides better protection for the thermotropic polymer blend against UV light than formulation in the thermotropic polymer blend itself.

The thermotropic polymer blend and the sheath polymer are fed separately in the molten state via an extruder to a die suitable for producing plural component films.

Such dies are described for example in U.S. Pat. No. 5,234,650 and U.S. Pat. No. 5,162,074. The resulting plural component film comprising a thermotropic core and transparent sheath material are not restricted with regard to the number and the cross section of the cores. The core may in the simplest case have a circular cross section and be allsidedly surrounded by the sheath material. However, particular styling of the dies makes it possible to produce a very wide range of core cross sections and also cores in varying numbers.

Advantageously, one or more additional polymer cores may be provided in a nonthermotropic, but mechanically high strength material.

We claim:

1. A temperature controlled radiation transmission material comprising:
    at least one core of a thermotropic polymer blend having a lower critical separation temperature surrounded on all sides by a transparent sheath layer, wherein the thermotropic polymer blend is a blend of polymers selected from the group consisting of polystyrene, polyvinyl methyl ether, polymethyl (meth)acrylate, styrene-acrylonitrile copolymers, poly-ε-caprolactone, chlororubber, ethylene-vinyl acetate copolymers, PVC, polycarbonate, polyvinylidene fluoride, polyethyl acrylate, poly-n-butyl acrylate, poly(ethylhexyl acrylate-co-acrylic acid), poly(tetradecyl methacrylate-co-styrene-co-3-dimethylamino-2,2-dimethlylprop-1-yl methacrylate), poly(styrene-co-hydroxyethyl methacrylate) and poly-propylene oxide.

2. The radiation transmission material according to claim 1, wherein said at least one core has an approximately circular or approximately rectangular cross-section.

3. The radiation transmission material according to claim 1, wherein said sheath layer comprises a screen.

4. The radiation transmission material according to claim 1, wherein said sheath layer comprises a transparent colorant.

5. The radiation transmission material according to claim 1, which comprises at least one additional polymer core comprised of a high tensile strength material.

6. The radiation transmission material according to claim 1, wherein the thermotropic polymer material is a blend of two polymers P1 and P2 mixed in a ratio P1:P2 of 5:95 to 95:5 on a weight percent basis.

7. The radiation transmission material according to claim 6, wherein said ratio ranges from 20:80 to 80:20 on a weight percent basis.

8. The radiation transmission material according to claim 1, wherein the thermotropic polymer material is a blend of polymers P1 and P2 each of which has a number average molecular weight of 500 to 1,000,000.

9. The radiation transmission material according to claim 8, wherein said number average molecular weight ranges from 1,000 to 500,000.

10. The radiation transmission material according to claim 1, wherein the sheath material is a polymer selected from the group consisting of polyacrylonitrile, modacrylics, polyesters, polyolefins, ethylene vinyl acetate, polyamide, aramid, polyurethane, polyphenylene sulfide, polyether ketone, polyvinyl chloride, polyvinylidene chloride, polyvinylidene fluoride, polytetrafluoroethylene and polyethylene-tetrafluoroethylene.

11. The temperature controlled radiation transmission material according to claim 1, wherein the temperature controlled radiation transmission material is in the form of a plural component film.

12. The temperature controlled radiation transmission material of claim 1, wherein the sheath layer is immiscible in the thermotropic polymer blend.

13. The temperature controlled radiation transmission material of claim 1, wherein the blend is a mixture of poly(styrene-co-hydroxyethyl methacrylate) and polypropylene oxide.

* * * * *